United States Patent [19]

Hoover et al.

[11] Patent Number: 4,529,020

[45] Date of Patent: Jul. 16, 1985

[54] METHOD AND APPARATUS FOR PRESSURE FILLING AN ELECTROCHEMICAL CELL

[75] Inventors: Thomas H. Hoover; Robert K. Messer, both of Gainesville, Fla.

[73] Assignee: General Electric Company, Gainesville, Fla.

[21] Appl. No.: 116,633

[22] Filed: Jan. 29, 1980

[51] Int. Cl.³ .................... B65B 1/40; H01M 4/82
[52] U.S. Cl. ..................... 141/103; 141/54; 29/623.1
[58] Field of Search ........... 29/623.1, 623.5, 730; 141/1.1, 4, 5, 47, 49, 51, 54, 63, 64, 103; 429/52, 94

[56] References Cited

U.S. PATENT DOCUMENTS 3,150,696  9/1964  De Freyne .................. 141/51
3,911,972  10/1975  Hubers et al. ............ 141/51 X
4,006,281  2/1977  Markin et al. ............ 429/52 X

FOREIGN PATENT DOCUMENTS 777085  6/1957  United Kingdom ............ 141/5

Primary Examiner—Stephen Marcus
Assistant Examiner—Ernest G. Cusick
Attorney, Agent, or Firm—Henry J. Policinski

[57] ABSTRACT

An electrochemical cell, carried along a cell production line, is filled with liquid electrolyte under pressure. First, the electrolyte is dispersed on top of the cell electrode assembly within an open ended cell casing. Then a pressurizing chamber is mated with the cell support member of the conveyor mechanism so as to form a pressurizing volume surrounding the cell, whereupon a gas under pressure is introduced into the chamber and forces the electrolyte into the separator of the electrolyte assembly for rapid and complete absorption of the electrolyte.

5 Claims, 5 Drawing Figures

METHOD AND APPARATUS FOR PRESSURE FILLING AN ELECTROCHEMICAL CELL

BACKGROUND OF THE INVENTION

This invention relates to the manufacture of rechargeable electrochemical cells and, more particularly, to the filling of such cells with liquid electrolyte. A typical electrochemical cell, such as a nickel-cadmium cell, is formed of positive and negative electrode plates having an intermediate separator layer of porous material, the electrode plates and the separator being rolled into a cylindrical electrode coil, or roll, which is inserted in an open-ended cylindrical cell casing. Prior to closing the top of the casing, a liquid electrolyte is added, the liquid soaking into the porous separator material so as to maintain an electrolyte solution between the positive and negative electrode plates. A problem arises in the manufacture of such cells in that the porous material of the spacer absorbs the electrolyte at a rate which is relatively slow compared to the speed of other steps in the automated manufacture of such cells. Typically, in the fabrication of the cells, the cans containing the cell roll are supported on a rotary index table which rotates to transport the cells from station to station to accomplish such steps as the filling of the cells and the sealing of the cells. The electrolyte is deposited into the top of the cell casing by the filler tube of a dispenser. In order to ensure that a cell is completely filled with the electrolyte prior to closing and sealing the cell casing, the electrolyte must be allowed to percolate through the separator from the top of the cells.

However, because the electrode and separator layers are usually very tightly wound, the separator is compressed between the electrode surfaces, and the rate of penetration of the electrolyte through the separator is slow. Accordingly, the electrolyte filling step has introduced delays in the manufacturing operation since substantially more time may be required to permit the electrolyte to become absorbed by the separator than is taken by the other steps on the production line.

One attempt at increasing the process of absorption of the electrolyte liquid into the separator material has utilized a partial vacuum enclosing the cell, the electrolyte liquid being dispensed on the top of the electrode coil under the conditions of the partial vacuum. Thereafter, upon restoration of atmospheric pressure and the penetration of the electrolyte liquid into the separator material, it has been found that the cell was not adequately filled with the electrolyte, apparently because of the formation of voids within the separator material.

SUMMARY OF THE INVENTION

The aforementioned problem is overcome and other advantages are provided by a process in accordance with the invention for filling an electrolytic cell with electrolyte under pressure. The pressure filling of the cell increases the rate of absorption of the electrolyte into the spacing material and, thereby, ensures a more complete filling of the cell with a substantial reduction in filling time.

The filling process is accomplished by a filling apparatus which, in accordance with the invention, utilizes two stations of the manufacturing operation. In the first of the two stations, a layer of electrolyte is deposited on the top of the cell roll. The walls of the cell casing, or can, extend above the roll to hold the layer of electrolyte on the roll. In the second of the two stations, a pressure cap encloses the can whereupon air, under a pressure of approximately 10 to 25 psi (pounds per square inch) in excess of atmospheric pressure, is introduced into the pressure cap. To minimize splashing of the electrolyte, the pressure is gradually increased during an interval of time, preferably ½ second to 1 second, and is then reduced to atmospheric pressure over a similar interval of time, preferably ½ to 1 second.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENT

Figure 1:
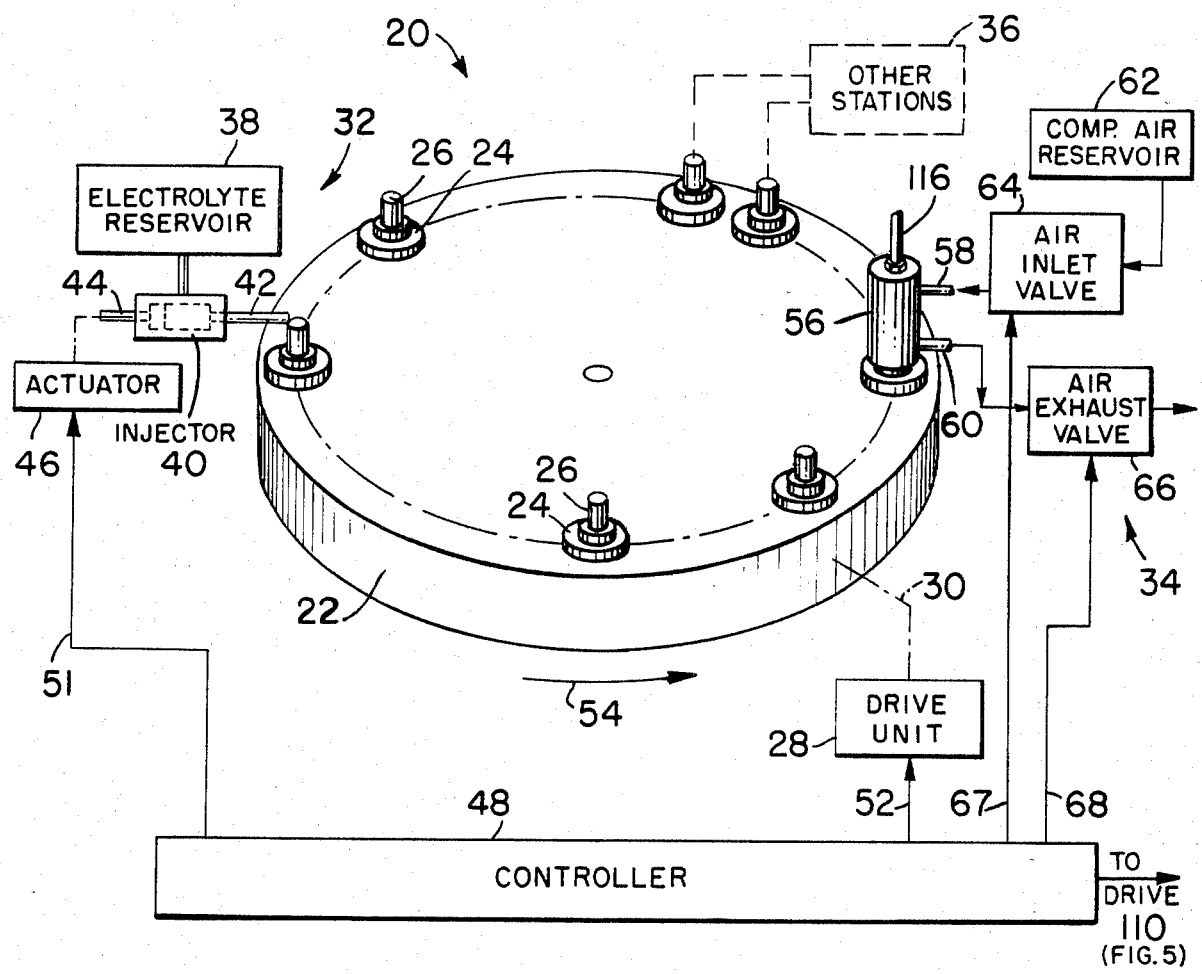
FIG. 1 is a stylized pictorial view, partially diagrammatic, of a rotary index assembly for transporting electrolytic cells from a dispenser of electrolyte to a pressure cap operative in accordance with the invention, to cause the electrolyte to penetrate the separator under pressure.

Referring now to FIG. 1, a pressurized filling system 20 includes a rotary index table 22 having cell supporting members, referred to nests 24, for holding individual cells 26 which are to be filled with electrolyte. A drive unit 28 is mechanically coupled to the table 22, as indicated by a dashed line 30, for rotating the table 22 to transport a cell 26 step-wise from one operating station to the next operating station. An exemplary table 22 contains approximately 24 nests, this providing 24 separate indexing locations or stations, whereby, incompleted cells may be loaded onto the table at the first of the locations, with the completed cells being unloaded from the table at the twenty-third and twenty-fourth locations. A more complete description of the rotary indexing table 22, as well as of the other manufacturing operations which are accomplished during transport of the cells 26, are found in co-pending patent application Ser. No. 55,978, filed on July 9, 1979, which is assigned to the assignee of this application.

In accordance with the invention, the system 20 includes a dispenser 32 at one of the stations for dispensing electrolyte to individual ones of the cells 26, and a pressurizing unit 34 at a subsequent one of the stations. By means of the pressurizing unit 34, liquid electrolyte is forced into a spirally wound separator layer of the cell 26 to establish a more complete absorption of the electrolyte. The forcing of the liquid electrolyte into the separator layer provides a much increased rate of absorption. The dispenser 32 and the pressurizing unit 34 are shown in the Figure as two stations about the table 22 with other stations 36, such as a sealing station and a sizing station, being indicated in phantom view in the Figure.

The dispenser 32 comprises a reservoir 38 for storing the electrolyte and an injector 40 for withdrawing a predetermined measure of electrolyte from the reservoir 38 and delivering it via a tube 42 to a cell 26 which is momentarily located at the location immediately beneath the dispenser tube 42. The dispenser 32 includes a pump shown as a piston 44 positioned within the injector 40 and driven by an actuator 46. The dispenser 32 may be made of a form available commercially for automatically metering fixed liquid quantities, the piston 44 and the actuator 46 representing such a commercially available mechanism wherein a fixed liquid quantity is dispensed from the injector 40. For example, one such commercially available dispenser is marketed by the T. L. Systems Corporation of Minneapolis, Minn., and comprises a pump actuated by a cam positioned on a shaft (not shown in the Figure), the shaft making one revolution during an indexing of the table 22 from one station to the next station in response to electrical signals from a controller 48. The controller 48 is understood to comprise well-known electrical timing circuitry for coupling signals via lines 51-52 to the drive unit 28 and the actuator 46 for imparting rotation to the table 22, in the direction of an arrow 54, and simultaneously operating the dispenser pump for dispensing a predetermined measure of liquid electrolyte to each of the cells 26 as they are sequentially indexed to the station of the dispenser 32.

The pressurizing unit 34 comprises a pressure cap 56 which is lowered upon a cell 26 to enclose the cell 26 for exerting pressure on a layer of electrolyte situated in the upper portion of the cell 26, as will be described with reference to FIG. 2. The cap 56 has an inlet line 58 and an outlet line 60 whereby air, under pressure, is admitted to the cap 56 at the beginning of a pressurizing interval and exhausted at the end of the pressurizing interval. Pressurized air is stored in a reservoir 62 via an air inlet valve 64 to the inlet line 58. The inlet valve 64 regulates the flow of the compressed air so that the pressure within the cap 56 increases at a predetermined rate during an interval of time from ½ second to 1 second so as to prevent splashing of the electrolyte within the cell 26. Similarly, an exhaust valve 56 allows the compressed air to exhaust at a predetermined rate over a similar interval of time from ½ second to 1 second to ensure retention of the electrolyte within the cell 26. In the preferred embodiment of the invention, a time interval of 0.8 seconds was found to produce a good filling of the cell 26. The respective operations of the valves 64 and 66 are synchronized by timing signals with the aforementioned operations and the actuator 46 and the drive unit 28, the timing signals being provided by the controller 48 via lines 67-68. Thereby, the table 22 sets each cell 26 within its respective station sequentially for the prescribed amount of time to permit the dispensing of the electrolyte and the administration of the pressure.

Figure 2:
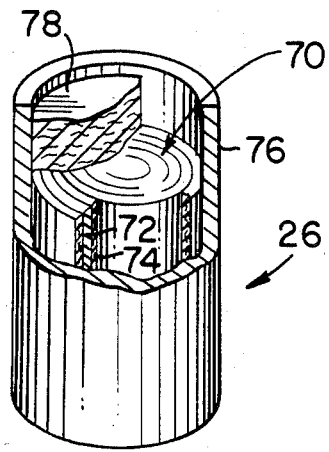
FIG. 2 is a view, partially cut-away, of an electrolytic cell, the view showing a portion of the layer of electrolyte on top of the cell roll prior to the application of the pressure.

Referring now to FIG. 2, the cut-away view of the cell 26 shows a cell roll 70 which is formed of a coiled electrode assembly comprising two electrode plates 72, the successive turns of the coiled plates 72 being spaced apart by layers of separator material 74. The coil assembly of the plates 72 and the separator 74 is secured within a can 76 of the cell 26. The positive plate electrode is connected to a positive terminal (not shown) during final assembly while the material of the can 76 serves as the terminal for the other electrode of the cell 26. A portion of a layer of electrolyte 78 is seen above the roll 70. The layer of electrolyte 78 is held in position by the lip of the can 76. The electrolyte 78 slowly percolates into the separator 74 under the influence of atmospheric pressure, the rate of circulation and absorption into the separator 74 being greatly increased when pressure is increased, for example, to approximately two atmospheres of pressure, this being a gauge pressure of 15 psi. Such an increase of pressure is provided by the pressure cap 56, as will be described with reference to FIG. 3.

Figure 3:
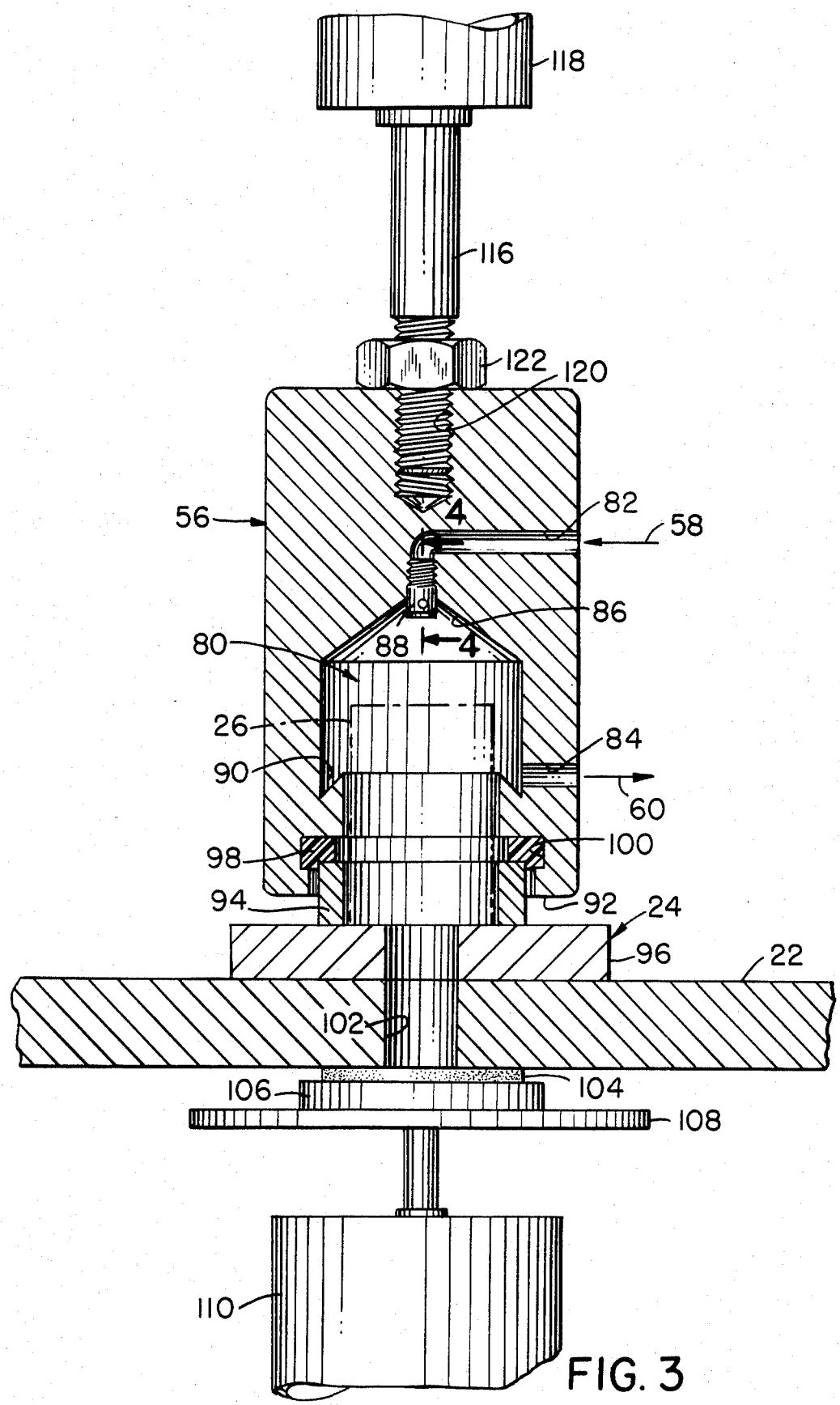
FIG. 3 is a sectional view of a pressure cap suitable for use in the invention and constituting an element of the apparatus of FIG. 1.

Referring now to FIG. 3, the pressure cap 56 is seen to comprise a central chamber 80 having an inlet port 82 which communicates with the inlet line 58 (indicated diagrammatically) and an outlet port 84 which communicates with the outlet line 60 (indicated diagrammatically). The inlet port 82 terminates in a conically shaped dome 86 at the top of the chamber 80, the terminus of the inlet port 82 partially enclosing a Tee shaped nozzle 88 which projects outwardly into the chamber 80. The outlet port 84 terminates in a re-entrant trough 90, the trough 90 being disposed within a side wall 80 and having its opening directed upwardly towards the dome 86. The bottom portion of the chamber 80 terminates in a lip 92 for mating with a lip 94 of a nest 24. The lip 94 is shown as a cylindrical section which sits on a circular plate 96 of the nest 24, the nest 24 being supported by the table 22. The pressure cap 56 includes a resilient seal 98 positioned within a shelf 100 to provide a tight seal between the lip 92 and 94. Also seen in FIG. 3 is the outline of a cell 26 which is understood to include the electrolyte layer 78 of FIG. 2, the cell 26 being shown in phantom in FIG. 3 to indicate the position of the cell 26 when enclosed by the pressure cap 56.

The rotary index table 22, utilized in the preferred embodiment of the invention, is advantageously provided with a bore 102 through which a plunger, not seen in the Figure is utilized in the final stations of the system 20 of FIG. 1 for ejecting a cell 26 from its nest 24. For example, one such plunger and its associated drive unit may be utilized for ejecting completed cells which are found to meet the required manufacturing specifications at a testing station (one of the other stations 36 of FIG. 1) while another of the plungers would be utilized in ejecting rejected cells which fail to show the required characteristics at the testing station.

In order to provide a pressure tight seal by means of the seal 98 and the lips 92 and 94, a seal 104, mounted on a box 106 of a plate 108, is driven by a pneumatic drive 110 against the underside of table 22 at the site of the bore 102 for closing off any exits of compressed air from within the chamber 80 around the bottom of the cell 26 and through the bore 102. Both of the seals 98 and 104 are manufactured of a material which is impervious to the electrolyte, a polyurethane being utilized for the seals 98 and 104 in the case of an electrolyte of potassium hydroxide. Also, the pressure cap 56 is advantageously fabricated of a material which is impervious to the electrolyte. In the case of the nickel-cadmium cell and the aforementioned electrolyte solution of potassium hydroxide, the cap 56 may be fabricated of an exemplary polycarbonate, such as the resin produced commercially under the name of "PLEXIGLASS".

Figure 4:
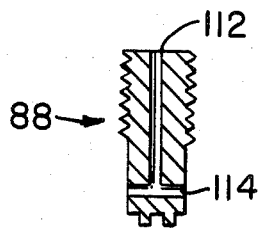
FIG. 4 is a sectional view of a nozzle used in the pressure cap of FIG. 3.

Referring also to FIG. 4, the nozzle 38 is seen to have a central bore 112 which communicates with a crossbore 114. During the pressurizing of the chamber 80 of FIG. 3, high velocity gases escaping from the terminal of the cross-bore 114 impinge upon the dome. The flow of gases along the dome 86 in combination with the flow imparted by the walls of a cell 26 and the trough 90 prevent a splashing of the layer 78 of electrolyte. Upon the reduction of pressure in the chamber 80, the flow imparted to the escaping gases by the dome 86 and the walls of the cell 26 and the trough 90 prevent a splashing of the electrolyte layer 78 in the final stages of absorption into the cell roll 70. The nozzle 88 is provided with screw threads for convenient insertion of the nozzle 88 within the terminus of the inlet port 82. The pressure cap 56 is suspended from a plunger 116 of a pneumatic drive 118 by means of a threaded longitudinal bore 120 which mates with a threaded end piece of the plunger 116. A nut 122 is tightened against the threads of the plunger 116 for securing the cap 56 to the plunger 116.

Figure 5:
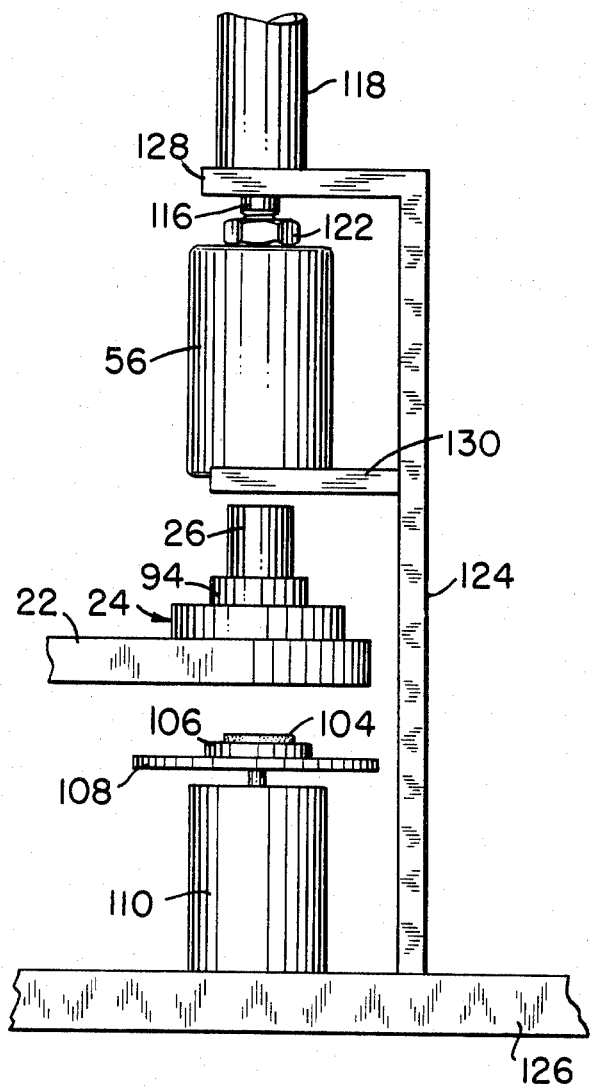
FIG. 5 is a side elevational view of a representative assembly including the pressure cap for forming a pressurized chamber about a cell transported to the pressure station by the rotary index assembly.

Referring also to FIG. 5, the vertical movement of the cap 56 to enclose the cell 26, as well as the vertical movement of the seal 104 against the bottom side of the table 22 to close off the bore 102, may be more readily seen. In FIG. 5, a frame 124 is seen to be supported by a base 126, the base 126 also supporting the drive 110. An upper arm 128 attached to the frame 124 supports the drive 118, while a lower arm 130, which is also attached to the frame 124, guides the cap 56 as it is lowered towards the cell 26 the drive 118. The advancing and retraction of the plungers of the drive 110 and 118 are controlled by signals of the controller 48 of FIG. 1 so that the pressurizing operation of the pressurizing unit 34 of FIG. 1 is accomplished in synchronism with the indexing of the table 22. In order to simplify the drawings and to better show the components of the system 20 of FIG. 1, the frame 124 of FIG. 5 has been deleted in FIGS. 1 and 3; also, the connections between the controller 48 and the drives 110 and 118 are not shown in that such connections are understood to function in the manner described previously with reference to lines 51–52 and 67–68 of the controller 48 of FIG. 1.

The system 20 of FIG. 1 demonstrates the filling operation at a pair of stations, namely, the stations of the dispenser 32 and of the pressurizing unit 34. In the event that the lip of the can 76, as seen in FIG. 2, does not have sufficient height to contain an adequate depth of electrolyte layer 78, then the filling operation of the system 20 can be accomplished by an iterative procedure wherein the table 22 returns the cell 26 to the dispenser 32 for the dispensing of the balance of the electrolyte to the cell 26, the dispensing being followed by a second pressurizing at the unit 34 so as to complete the filling of the cell 26. Alternatively, if desired, an additional dispenser 32 and an additional pressurizing unit 34 (not shown) may be included in the system 20 of FIG. 1 so that, upon a single rotation of the table 22, the cell 26 undergoes two electrolyte dispensing operations and two pressurizing operations.

It is to be understood that the above-described embodiment of the invention is illustrative only and that modifications thereof may occur to those skilled in the art. Accordingly, it is desired that this invention is not to be limited to the embodiment disclosed herein, but is to be limited only as defined by the appended claims.

What is claimed is:

1. Apparatus for filling an electrochemical cell with electrolyte comprising:
    a liquid dispenser including a tube for guiding a predetermined quantity of electrolyte into a cell upon an electrode assembly including a separator for said cell;
    a pressurizing unit including a cap for forming a pressure chamber communicating with the cell above said electrode assembly; and
    means for successively coupling said cell to said dispenser and to said pressurizing unit, said coupling means including timing means for delaying the operation of said pressurizing unit until after said electrolyte forms a layer upon said electrode assembly, said pressurizing unit applying a pressure to said layer to force said electrolyte into said separator, said means comprising rotatable means providing a first station at an outlet of said tube of said dispenser and a second station at the cap of said pressurizing unit.

2. Apparatus according to claim 1, wherein said timing means is connected to said table means, said dispenser, and said pressurizing unit for synchronizing the operation of said table means with said dispenser and said pressurizing unit.

3. Apparatus according to claim 1, wherein said pressurizing unit includes means for inhibiting a splashing of electrolyte, said inhibiting means comprising a tee-shaped nozzle within said cap for directing pressurizing gas transversely of said electrolyte layer, said cap having a conical dome enclosing said nozzle, said inhibiting means including a reentrant trough in a sidewall of said cap, said trough facing said dome.

4. Apparatus according to claim 3, wherein said cap includes a resilient seal for contacting a support means for said cell.

5. Apparatus according to claim 3, wherein said pressurizing unit includes a reservoir of compressed gas and valve means for metering said gas.

* * * * *